M. H. FLYNN.
TIRE HOLDER.
APPLICATION FILED NOV. 22, 1913.

1,146,417.

Patented July 13, 1915.
2 SHEETS—SHEET 1.

Witnesses
E. H. McCartley
P. H. Ross

Michael H. Flynn  Inventor
By  R. Porter
    Attorney

M. H. FLYNN.
TIRE HOLDER.
APPLICATION FILED NOV. 22, 1913.
1,146,417.
Patented July 13, 1915.
2 SHEETS—SHEET 2.
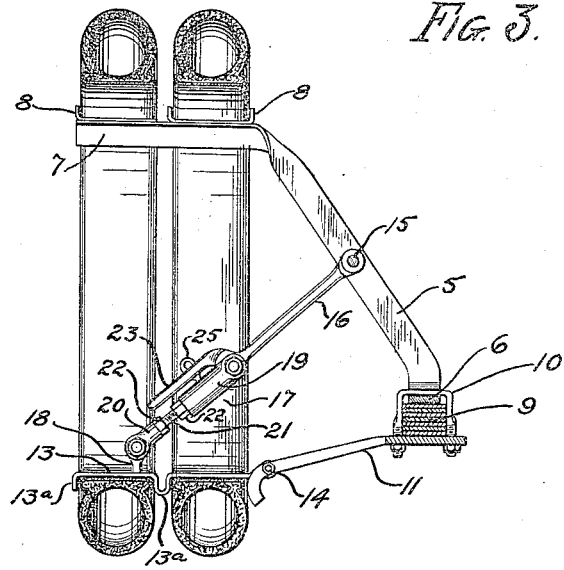
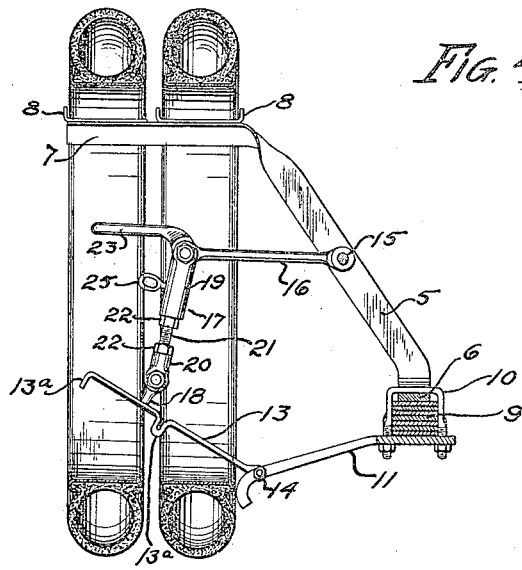

UNITED STATES PATENT OFFICE.

MICHAEL H. FLYNN, OF MILWAUKEE, WISCONSIN.

TIRE-HOLDER.

1,146,417.

Specification of Letters Patent.

Patented July 13, 1915.

Application filed November 22, 1913. Serial No. 802,466.

*To all whom it may concern:*

Be it known that I, MICHAEL H. FLYNN, a citizen of the United States, residing at Milwaukee, in the county of Milwaukee and State of Wisconsin, have invented new and useful Improvements in Tire-Holders, of which the following is a specification.

The present invention relates to means for holding tires on vehicles, and more specifically is intended for the purpose of securing spare tires on automobiles.

One of the primary objects of the invention is to provide a simple and practical structure that can be cheaply manufactured and applied in the form of an attachment to various types of automobiles, said structure constituting an effective means for holding one or more tires, and preventing their accidental loss or theft.

An embodiment of the invention that is at present considered the preferable one is illustrated in the accompanying drawings, wherein:—

Figure 1:
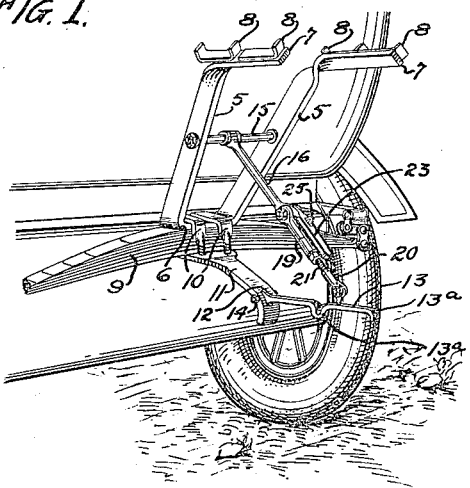
Figure 2:
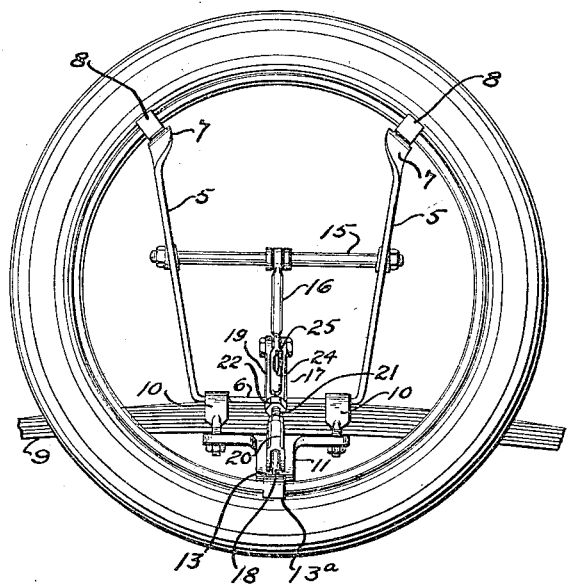

Figure 1 is a perspective view of the rear portion of an automobile, showing the holder in place thereon. Fig. 2 is a view in elevation of the said holder, with a tire secured therein. Fig. 3 is a side elevation partly in section of the support or holder. Fig. 4 is a similar view, but showing the same with the tire released.

Similar reference numerals designate corresponding parts in all the figures of the drawings.

In the embodiment illustrated, a tire support is employed in the form of a U-shaped bracket formed from a single bar having side arms 5 connected at one end by an integral portion 6 and having their other ends offset, as illustrated at 7. These offset portions have tire-engaging keepers 8 mounted thereon. In the embodiment shown, provision is made for two tires, though a greater or less number may be arranged for, as will be readily understood. In the particular embodiment illustrated, this bracket is clamped upon the rear spring 9 of an automobile by a pair of clips 10, but it will be obvious that the structure may be otherwise mounted, and may be placed in a different location if desired. The clips 10 in the structure disclosed, also serve to secure to the underside of the spring 9, a third arm 11, which has a rearward and downward inclination, and is disposed in a vertical plane lying between the arms 5. This arm 11 has an opening 12 in its outer end to receive a swinging tire-clamping member 13 that is pivoted to the arm 11 by a bolt or pivot pin 14.

The arms 5 of the upper support or bracket are connected by a tie rod 15 that serves as a pivot for one link 16 of a toggle, the other link, designated generally by the reference numeral 17, being an extensible link that is pivoted to an eye 18 carried by the swinging-clamping member 13. This member 13 is composed of two tubular parts 19 and 20, the part 19 being pivoted to the link 16, the part 20 being pivoted to the eye 18, and said two parts are joined by an adjustable screw connection 21, having jam nuts 22 thereon. With this arrangement, it will be evident that the link 17 can be lengthened or shortened, as desired. The link 16 is provided with an extension 23 constituting a handle for operating the toggle, and this extension has an opening 24 through which passes an eye 25 carried by the part 19, so that when the toggle is in its operative position, a lock passed through the eye will serve to prevent the toggle being broken and the tires released.

It is believed that the operation of the structure will be obvious. When the toggle is broken, or in other words when the links 16 and 17 are in angular relation, as shown in Fig. 4, tires may be placed upon the upper supports or removed therefrom without difficulty, and because two upper supports are employed, it will be evident that the tires when placed thereupon, will position themselves and cannot swing sidewise with respect to the vehicle. Furthermore it will be evident that when the toggle links are brought to alined position, as shown in Fig. 3, the member 13 will engage the tires and effectively clamp them in position, said member being bent to form suitable keepers 13ª.

From the foregoing, it is thought that the construction, operation and many advantages of the herein described invention will be apparent to those skilled in the art without further description, and it will be understood that various changes in the size, shape, proportion, and minor details of construction may be resorted to without departing from the spirit or sacrificing any of the advantages of the invention.

Having thus fully described my invention, what I claim as new and desire to secure by Letters Patent, is:—

1. In a tire holder, the combination with a spring-embracing clip, of an arm for securing the clip upon the spring, a tire clamping member pivoted to the arm, a substantially U-shaped bracket that engages beneath the clip, tire engaging elements carried by the arms of the bracket, and means connecting the bracket and clamping member for swinging the same and locking it in clamping position.

2. In a tire holder, the combination with a bracket comprising spaced tire supporting arms, of a pivoted tire clamping member, a cross brace between the arms, and a toggle connecting the brace and the clamping member for swinging the latter.

3. In a tire holder, the combination with a substantially U-shaped bracket having outstanding terminal portions, of tire-engaging elements carried by said terminal portions, a brace connecting the arms of the bracket between their ends, a pivoted tire clamping member operating in a plane between the arms of the bracket, and a toggle comprising hingedly connected links, one of which is pivoted on the brace, the other having a pivotal connection with the tire clamping member.

In testimony whereof I have hereunto set my hand in presence of two subscribing witnesses.

MICHAEL H. FLYNN.

Witnesses:
  THEO. RIEDEBURG,
  WM. BANNEN.